March 9, 1926.

J. C. WAFFORD

MEAT TENDERER

Filed Nov. 24, 1925

1,576,164

Inventor

J. C. WAFFORD,

By B. P. Welburne
Attorney

Patented Mar. 9, 1926.

1,576,164

UNITED STATES PATENT OFFICE.

JAMES C. WAFFORD, OF CHARLOTTE, NORTH CAROLINA.

MEAT TENDERER.

Application filed November 24, 1925. Serial No. 71,046.

*To all whom it may concern:*

Be it known that JAMES C. WAFFORD, a citizen of the United States of America, residing at Charlotte, in the county of Mecklenburg and State of North Carolina, has invented certain new and useful Improvements in Meat Tenderers, of which the following is a specification.

My invention relates to improvements in meat tenderers.

An important object of the invention is to provide a device of the above mentioned character, which is adapted for treating round steaks or T-bone steaks.

A further object of the invention is to provide a device of the above mentioned character, which is adjustable for action upon steaks of different thicknesses.

A further object of the invention is to provide a device of the above mentioned character which is of simplified construction and the parts of which may be readily separated, so that they may be cleaned.

Other objects and advantages of the invention will be apparent during the course of the following description.

Figure 1:
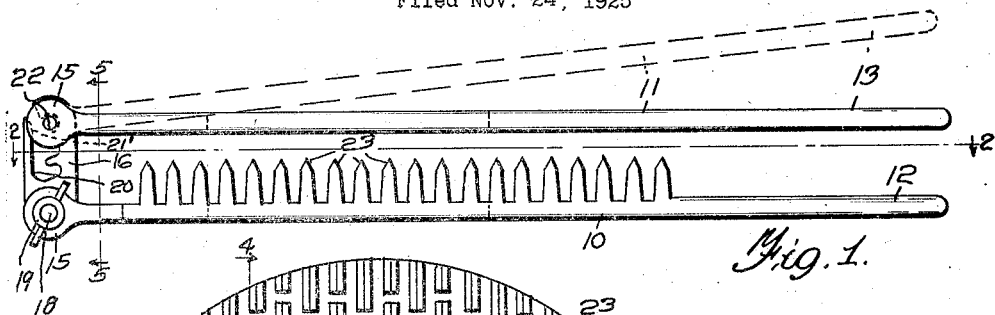
Figure 2:
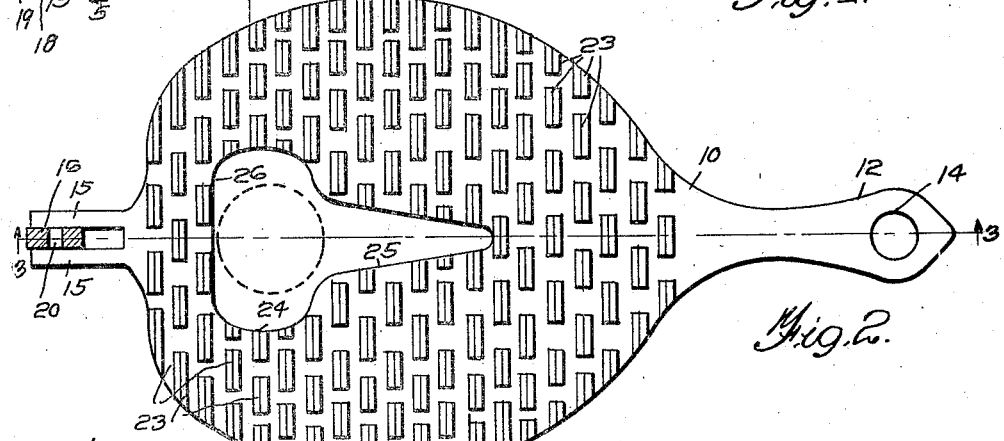
Figure 3:
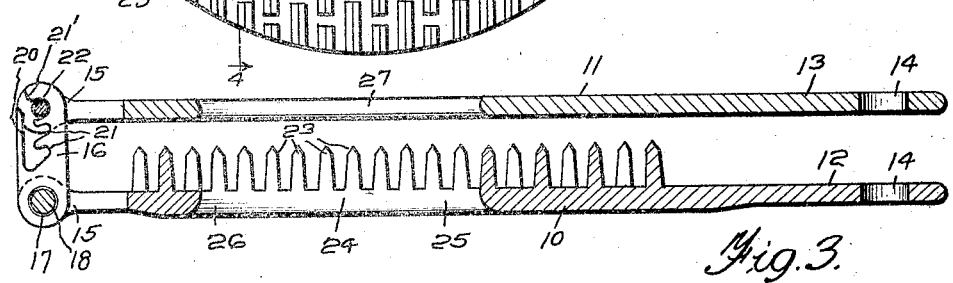
Figure 4:
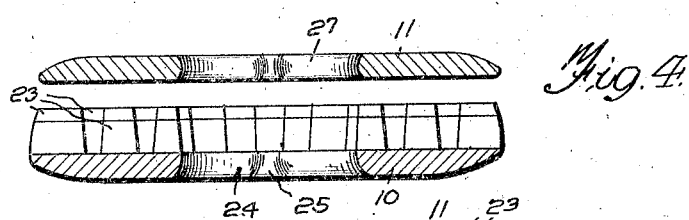
Figures 5, 6:
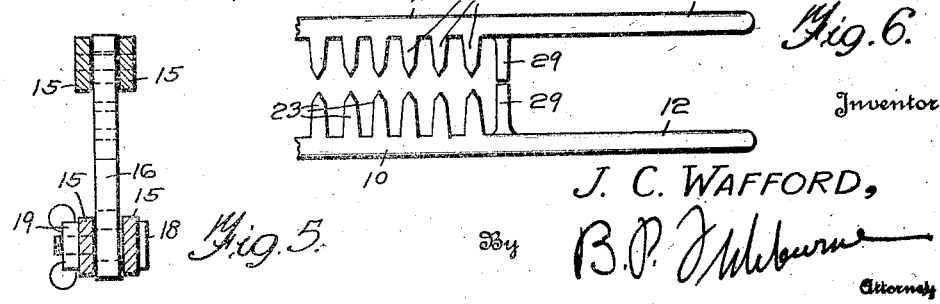

In the accompanying drawings forming a part of this specification and in which like numerals are employed to designate like parts throughout the same, Figure 1 is a side elevation of the device embodying my invention, Figure 2 is a horizontal section taken on line 2—2 of Figure 1, Figure 3 is a longitudinal section taken on line 3—3 of Figure 2, Figure 4 is a transverse section taken on line 4—4 of Figure 2, Figure 5 is a detailed section taken on line 5—5 of Figure 1, and, Figure 6 is a fragmentary side elevation of a modified form of the device embodying my invention.

In the drawings, wherein for the purpose of illustration, is shown a preferred embodiment of my invention, the numerals 10 and 11 designate plate members, which may be formed of cast iron, aluminium, or other suitable metal or material. These plate members are preferably of the same shape and size and are generally heart shaped. The plate members 10 and 11 are provided at their rear ends with handles 12 and 13, respectively, as shown. These handles have openings 14, whereby the device may be conveniently hung upon a nail or the like, when not in use. Rigidly secured to the forward ends of the plate members 10 and 11, and preferably formed integral therewith, are pairs of apertured knuckles 15, receiving therebetween an adjustable connecting link 16. The link 16 is provided at its lower end with an aperture 17, for receiving a pivot element or pin 18, carrying a thumb nut 19. The link 16 is provided with a longitudinal slot 20, having spaced notches 21 for receiving a pin or pivot element 22, carried by the knuckles 15 of the upper plate member 11. It is obvious that the pin 22 may be inserted within a selected notch 21, thereby varying the distance between the plate members. The link 16 is provided opposite the notches 21 with an inclined opening 21', whereby the plate members may be quickly separated. Further, these plate members may be separated by unscrewing the thumb nut 19 and removing the pin 18.

As more clearly shown in Figure 2, the inner or upper face of the plate member 10 is provided with teeth or blades 23, the upper ends of which are beveled and suitably sharpened. These teeth are arranged in transverse rows, and the teeth in one row are staggered, with relation to the teeth in the adjacent row. The plate member 10 is provided near its center with a generally T-shaped opening 24, embodying a tapered longitudinal portion 25, and a transverse portion 26, which is considerably wider than the longitudinal portion. This opening 24 is combined round bone and T-bone receiving opening, whereby the device may be used upon round or T-bone steaks. The dotted line indicates spaces provided for the reception of the round bone. The teeth 23 extend right up to the edge of the opening 26, and some of these teeth are partially cut away, whereby they are rendered slim and will more readily enter the steak, and will thus securely hold it against displacement, adjacent to the bone. The co-acting plate member 11 is preferably provided with a generally T-shaped opening 27, corresponding in shape and size to the opening 24. In this form of my invention, the plate member 11 is shown as having its inner face free from teeth.

However, I contemplate providing both plate members 10 and 11 with teeth 23, and in this case, the plate members will be identical. When this is done, the plate members, Figure 6, are provided with spacing lugs 29, adjacent to the handles 12 and 13, whereby the sets of teeth 23 carried by the two plate members cannot be brought into engagement with each other to dull the same.

In the use of the device, the plate member 10 is preferably arranged lowermost, and the steak is positioned upon the teeth 23 thereof, with the round bone or T-bone positioned over the opening 24. The upper plate member 11 is now brought downward and pressure applied thereto, whereby the teeth suitably enter the meat, and hack or cut the same.

While the device has been described as adapted for use in connection with treating meat, it is obvious that other materials may be treated therewith, such as vegetables or the like.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, what I claim is:

1. A meat tenderer comprising a pair of pivotally connected plate members, one plate member having inwardly projecting teeth, the plate member having the teeth being provided with a combined round bone and T-bone receiving opening.

2. A meat tenderer comprising a pair of pivotally connected plate members, one plate member having inwardly projecting teeth, the last named plate member having an approximately T-shaped opening formed therein, said T-shaped opening embodying a transverse portion of greater width than its longitudinal portion.

3. A meat tenderer comprising a pair of pivotally connected plate members, one plate member having transverse rows of inwardly projecting teeth, the teeth in one row being staggered with relation to the teeth in the adjacent row, the last named plate member having an approximately T-shaped opening extending longitudinally thereof and embodying longitudinal and transverse portions, the transverse portions being of a greater width than the longitudinal portions.

In testimony whereof I affix my signature.

JAMES C. WAFFORD.